United States Patent
Shah et al.

(10) Patent No.: US 6,400,646 B1
(45) Date of Patent: Jun. 4, 2002

(54) METHOD FOR COMPENSATING FOR REMOTE CLOCK OFFSET

(75) Inventors: Vimal V. Shah; John W. Minear, both of Houston; Robert Malloy, Katy; James R. Birchak, Spring; Wallace R. Gardner, Houston; Carl Robbins, Tomball, all of TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/457,996

(22) Filed: Dec. 9, 1999

(51) Int. Cl.[7] .................................................. H04H 9/00
(52) U.S. Cl. ......................... 367/82; 367/83; 367/79; 368/46
(58) Field of Search .......................... 367/82, 83, 50, 367/76, 79; 368/46, 52, 55, 62

(56) References Cited

U.S. PATENT DOCUMENTS

| 4,254,481 A | 3/1981 | Smither et al. ............... 367/82 |
| 4,293,937 A | 10/1981 | Sharp et al. ................. 367/82 |
| 4,298,970 A | 11/1981 | Shawhan et al. ............. 367/82 |
| 4,320,473 A | 3/1982 | Smither et al. ............... 367/82 |
| 4,368,987 A | * 1/1983 | Waters ......................... 368/46 |
| 4,562,559 A | 12/1985 | Sharp et al. .................. 367/82 |
| 5,425,004 A | * 6/1995 | Staffan ........................ 368/46 |
| 5,592,438 A | 1/1997 | Rorden et al. ................ 367/83 |
| 5,850,369 A | 12/1998 | Rorden et al. ................ 367/83 |
| 5,924,499 A | 7/1999 | Birchak et al. ............... 175/40 |
| 6,131,694 A | 10/2000 | Robbins et al. ............. 181/105 |
| 6,236,623 B1 | * 5/2001 | Read et al. .................... 368/46 |

OTHER PUBLICATIONS

PCT International Search Report for International Application No. PCT/US00/42113, dated May 25, 2001 (4 p.).

* cited by examiner

*Primary Examiner*—Timothy Edwards
(74) *Attorney, Agent, or Firm*—Conley, Rose & Tayon, P.C.

(57) ABSTRACT

A system is disclosed for synchronizing a clock in a well containing a drill string with a clock located near the surface of the well. The system includes devices for transmitting and receiving a pair of acoustic signals between locations associated with each clock and processing those signals. The system determines the time of arrival of each acoustic signal by analyzing the shape of a function of the acoustic signal chosen from a group of functions suitable to determine a clock offset with millisecond accuracy.

26 Claims, 11 Drawing Sheets

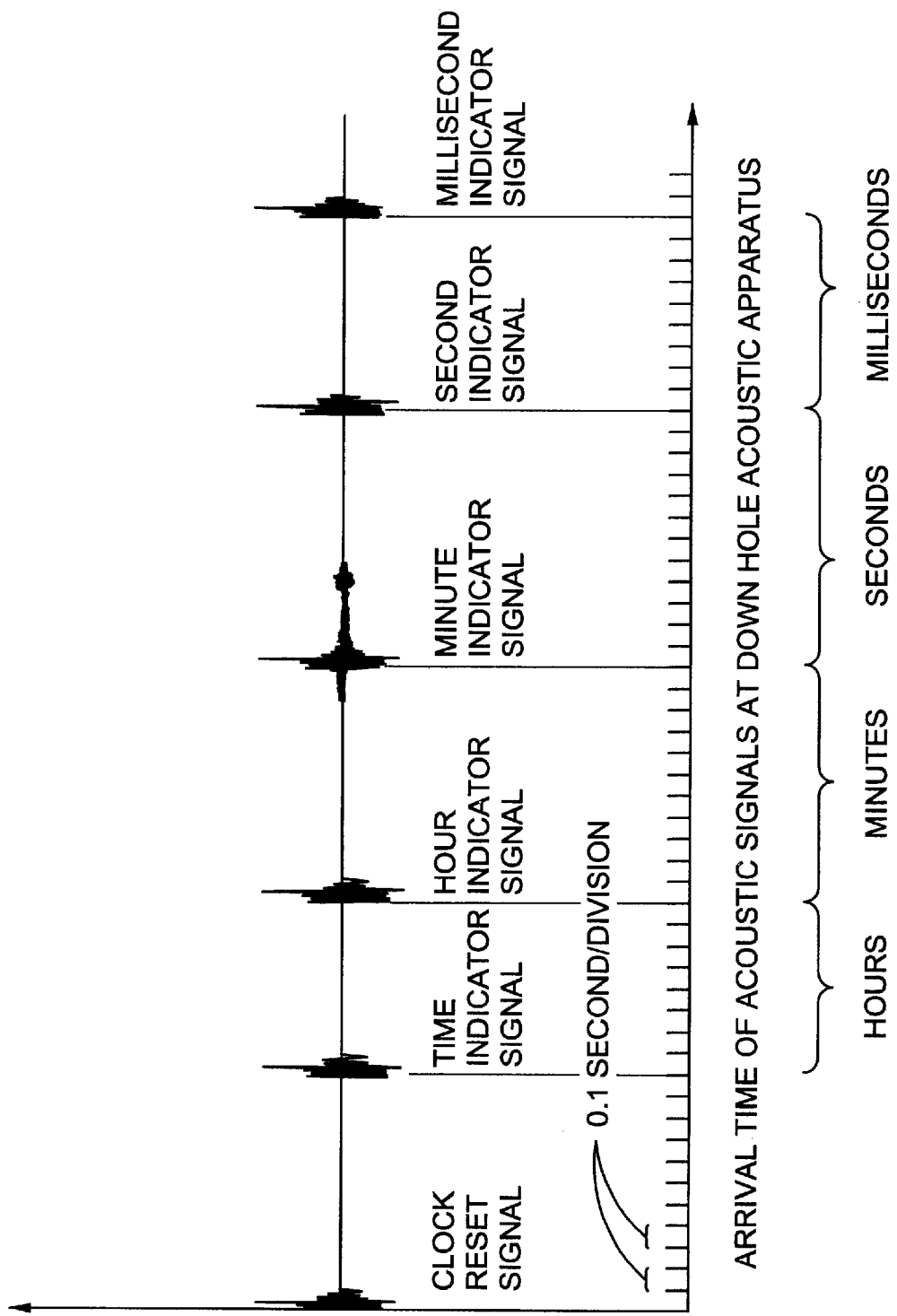

METHOD FOR COMPENSATING FOR REMOTE CLOCK OFFSET

BACKGROUND OF THE INVENTION

1. Field of the Invention

The present invention generally relates to oilfield telemetry systems, and more specifically relates to a method for compensating for offset between a downhole clock and a clock in a surface installation.

2. Description of Related Art

Modem petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

Since the sonde is in direct electrical contact with the surface installation, the communications delay is negligible. Accordingly, measurements can be made and communicated in "real time". If it should be deemed necessary, a downhole clock in the sonde can be easily synchronized with a surface clock. A computer on the surface can reset a surface clock while simultaneously transmitting a reset command to the downhole clock. Any offset due to the communications delay is for all practical purposes insignificant.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

A number of techniques have been used to transmit data obtained from LWD measurements to the surface. These include mud pulse telemetry, electronic telemetry, acoustic telemetry, and the like, with the system chosen to accommodate the particular conditions and measurements under consideration. For example, it is impractical to run an electrical cable downhole during drilling operations. Consequently, measured data are communicated by other means such as mud pulse telemetry. In mud pulse telemetry, the flow of drilling mud through the drillstring is modulated by periodically obstructing the flow. The resulting pressure waves propagate upstream and can be sensed at the surface. As another example, when it is desired to detect formation boundaries and to map the structure of earth formations, it is useful to conduct seismic profiling. In seismic profiling, measurements are obtained using sound waves, also called acoustic waves or seismic waves. It is well known that mechanical disturbances can be used to cause acoustic waves in earth formations and that the properties of these waves can be measured to obtain important information about the formations through which the waves have propagated. As it is known in art, the arrival time of these waves via the formation provides very useful information regarding the type of formation.

In these examples and in other LWD systems, clocks are often employed to provide timing information at more than one location. If different locations are subjected to varying conditions, such as temperature and pressure, this may result in clock desynchronization. For LWD techniques where it is desirable to compensate for clock error, this issue has not been adequately addressed. Seismic profiling is one such technique.

In a basic version of seismic reflection profiling, an acoustic source is used to send a sound signal from the earth's surface, at an initial time. The signal travels down through the earth, reflecting off boundaries between different formation features. A portion of the reflected signal travels back to a receiver, which registers the intensity of the signal as a function of the time elapsed from the initial time. This allows the time to travel to and from a formation feature to be measured. If the speed of the signal is known, then the travel time can be converted to the distance from the surface, or depth, of the feature. Time measurements are typically made with reference to one or more clocks.

Variations on this basic method of seismic reflection profiling are known. In particular, in vertical seismic profiling, a plurality of seismic receivers are placed in the borehole, with each receiver being at a different depth in the borehole. These receivers are used in conjunction with seismic sources placed either on the surface or inside another well. In reverse seismic profiling a downhole source is used. The source may be the drill bit itself or an alternate source placed downhole. The downhole source is used in conjunction with a plurality of seismic receivers placed at different points on the surface. Combinations of these techniques of vertical seismic profiling and reverse seismic profiling are also known, including three and four dimensional seismic profiling.

The speed of the acoustic signal used in seismic profiling varies with the material through which the signal travels.

Therefore calibration of the seismic profiling measurements must be performed by measuring the acoustic travel time for a known distance. A measurement signal is known as a shot. A calibration signal which is used to obtain the speed of the sound wave is known as a checkshot. Calibration is performed by sending a signal a known distance and measuring the travel time. The time measurement is made with reference to one or more clocks.

Wireline checkshots may be used in conjunction with LWD shot measurements. In a traditional wireline checkshot a clock is associated with a seismic source on the surface. Another clock is associated with a receiver at the end of cable, which is lowered a known depth into the borehole. The industry has common downhole position measurement techniques that are known and may be used with checkshot measurements. The source clock is used to record the initial time of generation of the signal. The receiver clock is used to record to the time at which the signal reaches the receiver. Subsequent LWD shots can then be calibrated from the wireline checkshot.

As mentioned previously, wireline methods have the disadvantage that the drillstring must be tripped, causing delay and expense. Alternatively, tripping the drillstring may be avoided, by performing the checkshot while drilling, although drilling may be temporarily halted to reduce noise. An LWD checkshot may be carried out, for example, by transmitting the calibration signal along the casing or along the drillstring.

In LWD, the downhole clock may remain in the borehole for days at a time. Because the clock is sensitive to temperature, it will drift relative to the surface clock and lose synchronization. The magnitude of the drift on a crystal-based clock may be on the order of 30 milliseconds a day. When an accuracy of milliseconds is desired, this drift is unacceptable. An accuracy of milliseconds, for a representative speed of sound of 7.54 ft/msec, is equivalent to a spatial accuracy of 5–10 ft. This level of accuracy is necessary for evaluating reflections from thin, stratified formations, which may be capable of efficiently producing hydrocarbons. Therefore it is desirable to have a method to correct for the clock drift and compensate a downhole clock with a surface clock with millisecond accuracy. One method of compensation is to synchronize the clocks, that is to shift their time origins to be the same.

U.S. Pat. No. 5,850,369 describes a system in which acoustic transceivers are time synchronized. Initial synchronization is accomplished through transmission of a synchronization signal in the form of a repetitive chirp sequence by one of the units, such as the downhole acoustic transceiver. A second synchronization signal is transmitted from the surface acoustic transceiver (SAT). The second synchronization signal is comprised of two tones, each of a different frequency. Signal analysis of these tones by the downhole acoustic transceiver (DAT) enables the timing of the DAT to be adjusted in synchrony with the SAT.

There remains a need in the art for an accurate, precise, uncomplicated, and self-contained method to correct for desynchronization between a downhole clock and a surface clock for use in LWD systems that rely on acoustic telemetry.

SUMMARY OF THE INVENTION

Accordingly, there is provided herein a system to determine accurately the clock offset between a downhole clock and a surface clock. A pair of acoustic signals is exchanged between downhole and surface locations. Each clock is reset at a particular time with respect to one of the acoustic signals. The clock offset is obtained by processing each acoustic signal to accurately determine a travel time for each acoustic signal.

In one embodiment, the system includes a downhole acoustic apparatus for transmitting, receiving, and processing acoustic signals placed in a downhole sensor sub. The downhole acoustic apparatus is coupled to a downhole clock. The downhole acoustic apparatus includes a sensor coupled to a receiver for receiving a reset acoustic signal transmitted from the surface and a signal processor coupled to the receiver for determining the time of arrival of the reset acoustic signal and causing the clock to be reset. The signal processor may further include an analog/digital converter (ADC). The sampling rate of the ADC is several times higher than the frequency of the acoustic reset signal, preferably at least 10 times faster. The frequency of the signal processor is preferably several times higher than the sampling rate of the ADC. The downhole acoustic apparatus further includes a transmitter coupled to the signal processor and to a transducer for transmitting a return acoustic signal to the surface.

The system also includes a surface acoustic apparatus for transmitting, receiving, and processing acoustic signals, which is placed near the top of the drill string. The surface acoustic apparatus is coupled to a surface clock. The surface acoustic apparatus includes a transmitter coupled to a transducer for transmitting the reset acoustic signal and to a signal processor for causing the clock to be reset as the reset signal is transmitted. The surface acoustic apparatus further includes a receiver coupled to the signal processor and to a sensor for receiving the return acoustic signal.

Each signal processor is configured to determine the time of arrival of an acoustic signal by analyzing some characteristic of the acoustic signal. Examples of suitable characteristics include the root mean square average, the phase of the Hilbert transform, and a difference between the original signal and a multiple of a delayed version of the signal. The surface signal processor is further configured to determine a clock offset from the delay between transmission of the reset acoustic signal and receipt of the return acoustic signal.

An alternative embodiment of the system may include an intermediate acoustic apparatus for relaying acoustic signals between a downhole acoustic apparatus and a surface acoustic apparatus. The use of an intermediate acoustic apparatus may advantageously improve the reliability of the procedure to determine a clock offset between a downhole and a surface clock when the downhole clock is below the mud motor.

In another alternative embodiment the downhole acoustic apparatus is capable of receiving a sequence of acoustic signals following the reset acoustic signal. The downhole signal processor is capable of determining the arrival times of the subsequent signals. Further the signal processor can advantageously process the arrival times to ascertain and store the surface clock information for time stamping subsequently measured LWD data.

BRIEF DESCRIPTION OF THE DRAWINGS

For a detailed description of the preferred embodiment of the invention, reference will be made to the accompanying drawings, wherein:

FIG. 7 shows an embodiment of transmitting surface clock time information and its decoding scheme at the downhole acoustic apparatus.

During the course of the following description, the terms "uphole," "upper," "above" and the like are used synonymously to reflect position in a well path, where the surface of the well is the upper or topmost point. Similarly, the terms "downhole," "lower," "below" and the like are also used to refer to position in a well path where the bottom of the well is the furthest point drilled along the well path from the surface. As one skilled in the art will realize, a well may deviate significantly from the vertical, and, in fact, may at times be horizontal. Thus, the foregoing terms should not be regarded as relating to depth or verticality, but instead should be construed as relating to the position in the path of the well between the surface and the bottom of the well.

DETAILED DESCRIPTION

Overall System

Figure 1:
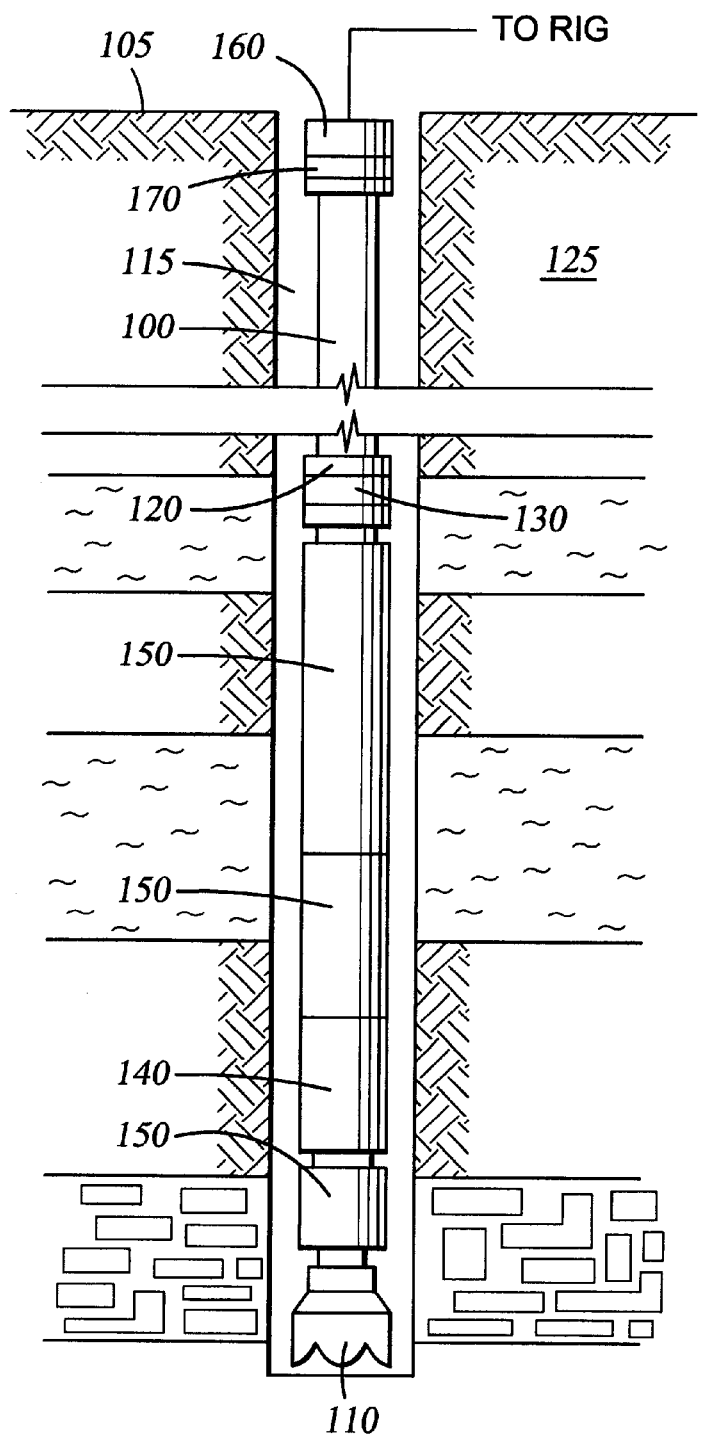
FIG. 1 is a cut-away view of an embodiment of the invention.

Referring now to FIG. 1, a system for determining a clock offset configured in accordance with a preferred embodiment includes a drill string 100. Drill string 100 is in contact with a rig at the surface 105. A drill bit 110 creates a well bore 115 through the surrounding formation 125, which may also include formation boundaries. Drilling mud is circulated down through drill string 100 and up the annulus around drill string 100 to cool the drill bit 110 and remove cuttings from the borehole.

A sensor sub 120 is situated above the drill bit. Sensor sub 120 carries acoustic apparatus 130 for transmitting, receiving, and processing acoustic signals passing along drill string 100. For illustrative purposes, sensor sub 120 is shown in FIG. 1 positioned above motor 140. Other sensor subs 150 may be included as required in the downhole system. A sensor sub carrying an acoustic apparatus may be positioned below the motor 140, with sensor sub 120 used to relay information to the surface. Communication between the acoustic apparatus below the motor and the downhole acoustic apparatus 130 may be accomplished by use of a short hop acoustic telemetry system, such as disclosed in U.S. Pat. No 5,924,499, herein incorporated by reference. At the surface 105, supported by drill string 100, a surface sub 160 carries acoustic apparatus 170. Surface sub 160 may be supported also by a surface rig (not shown). Signals received at acoustic apparatus 170 may be processed within acoustic apparatus 170 or sent to a surface installation for processing. Power for the acoustic apparatuses housed within sensor subs 120 may be provided by a battery pack (not shown). Alternatively, power may be generated from the flow of drilling mud using turbines as is well known in the art.

It is noted that acoustic apparatus 130 is hereafter termed a downhole acoustic apparatus, and acoustic apparatus 170 is termed a surface acoustic apparatus.

Acoustic Apparatus Circuitry

Figure 2:
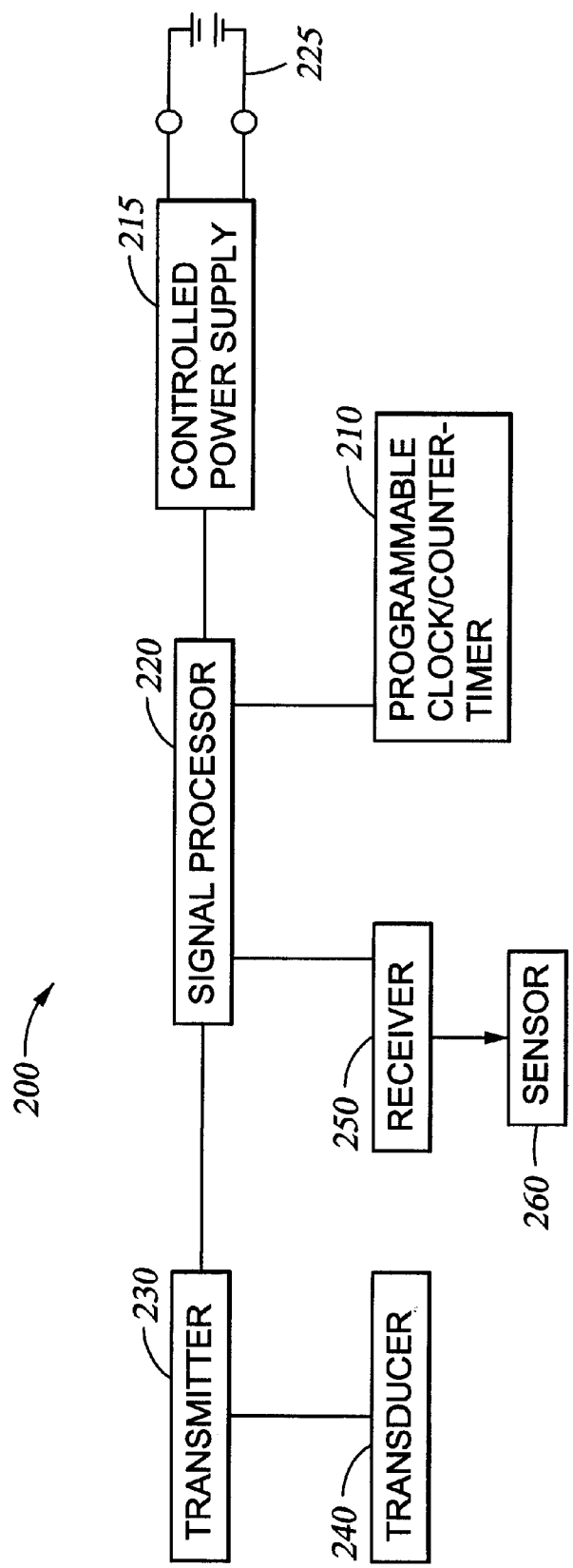
FIG. 2 is a functional block diagram of the acoustic apparatus circuitry.

Referring to FIG. 2, the downhole acoustic apparatus circuitry 200 located at sensor sub 120 preferably includes a downhole power supply 215 connected to a downhole battery pack 225, a downhole signal processor 220, a downhole transmitter 230 which connects electrically to downhole transducer 240, and a downhole receiver 250 connected electrically to downhole sensor 260. Signal processor 220 includes or is coupled to a downhole clock 210. The downhole clock is programmable and includes a counter-timer.

Power for acoustic apparatus circuitry 200 is obtained from downhole controlled power supply 215. Power supply 215 connects to the downhole battery pack 225 and receives dc power from it. Downhole power supply 215 converts the battery power to an acceptable level for use by the digital circuits. When an acoustic reset signal arrives at a downhole acoustic apparatus (e.g. apparatus 130) associated with clock 220, downhole sensor 260 converts the acoustic signal to an electrical signal which is received by downhole receiver 250 for processing by downhole signal processor 220. The signal processor determines the arrival time of the acoustic reset signal, causes the downhole clock 220 to reset, and waits a preset delay time for the acoustic signal to ring down, as detailed further below. After the preset delay time, the signal processor outputs a return signal to a downhole transmitter 230. Downhole transmitter 230 connects electrically to downhole transducer 240 and provides a signal to downhole transducer assembly 240 at a frequency determined by the signal processor. The downhole transducer 240 causes the transmission of a return acoustic signal that propagates along drill string 100 and is received at the surface acoustic apparatus 170.

Operation of the acoustic apparatus circuitry for the surface acoustic apparatus 170 is similar in form, although the surface signal processor may comprise additional features useful to surface operation and which may not be feasible to include with the downhole signal processor. For example, the power supply is not necessarily connected to a battery pack, but may be connected to a power source associated with the rig.

Figure 3:
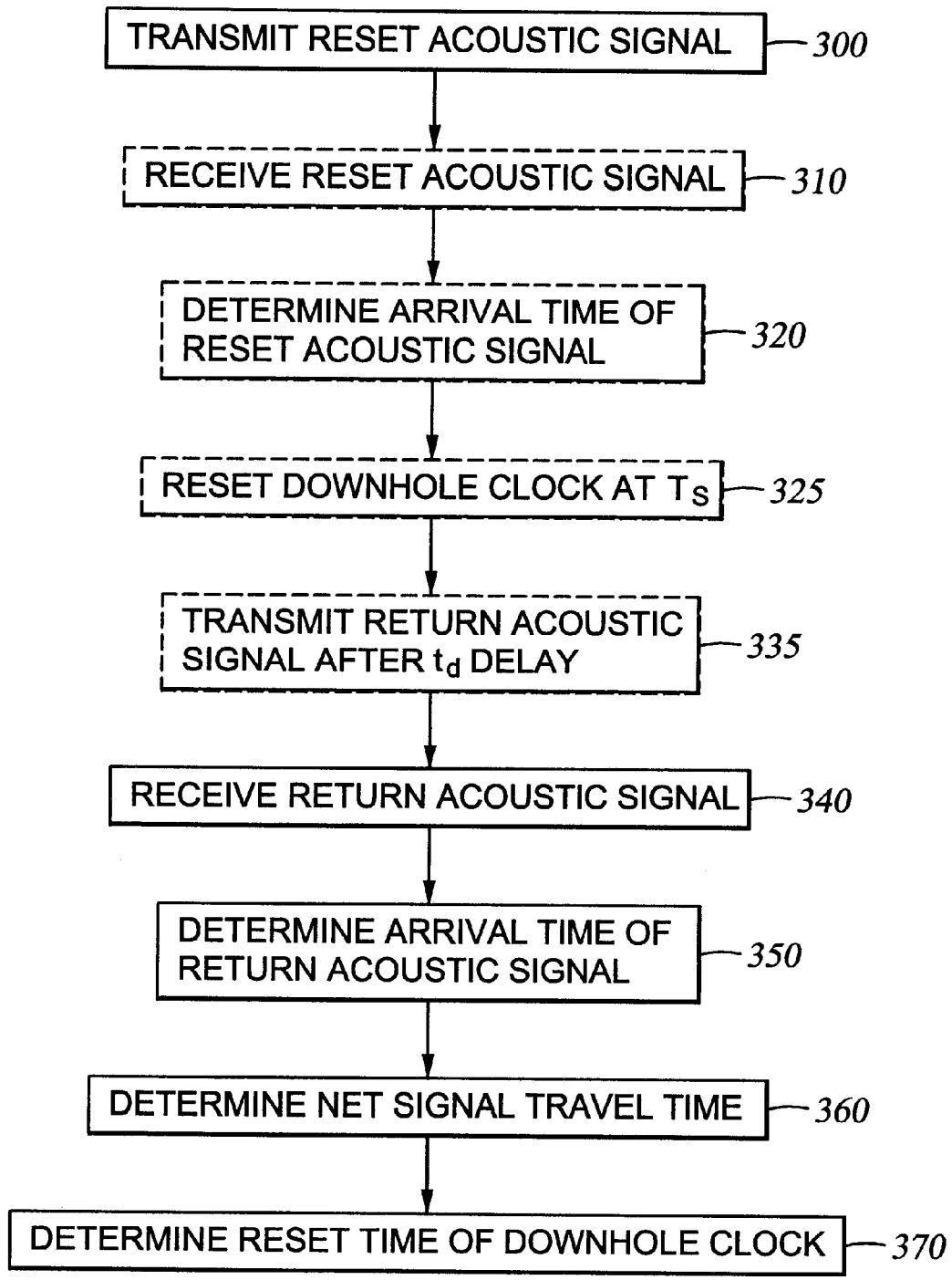
FIG. 3 is a flow diagram of an embodiment of the method to determine a clock offset.

Referring to FIG. 3, upon the desire of the operator or at a predetermined time or in response to a predetermined condition, the surface signal processor causes the surface transmitter to transmit 300 a reset acoustic signal which is converted to an acoustic wave traveling along the drill string and received downhole by the downhole transducer. Upon transmission 300 of the reset acoustic signal the surface signal processor may optionally cause the surface clock to be reset (not shown). As explained further below, the reset acoustic signal causes the downhole acoustic apparatus to reset the downhole clock 325 and, after a preset time interval, transmit a return acoustic signal 335. The return acoustic signal is received 340 by the surface receiver and provided to the surface signal processor which determines 350 the arrival time of the return acoustic signal. As explained further below, the surface signal processor next determines 360 the net travel time of the reset and return acoustic signals between surface and downhole acoustic apparatuses and finally determines 370 the clock offset. Contemplated variations include varying the operation (i.e. signal transmission or receipt) which causes a clock to be reset. For example, the surface clock may be reset optionally upon receipt 310 of the synchronization acoustic signal by the surface receiver and determination 320 of the time of arrival of the synchronization acoustic signal by the surface signal processor. Likewise, the downhole clock may be reset upon transmission of the synchronization signal by the downhole acoustic receiver. It is convenient for the operation of the clock synchronization system that the downhole transducer be of substantially the same form as the surface transducer. This allows the return acoustic signal to have substantially the same form upon transmission as the reset acoustic signal. Thus procedures to determine the time of arrival of an acoustic signal will work similarly upon the reset and return acoustic signals, thereby producing a consistent, uncomplex arrival time determination useful for determining an accurate clock offset using analog acoustic signal waveforms.

Acoustic Signal Path

Both the reset and the return acoustic signals are preferably transmitted along a path through the drill string. In alternative embodiments the acoustic signals are transmitted through a wellbore casing, through the mud or through the formation. Surface sub 160 preferably carries acoustic apparatus 170 which is matched to acoustic apparatus 130 by being of substantially the same form, as disclosed above. This matching of acoustic apparatuses, in particular matching of each transducer for sending acoustic signals, allows the shape of the analog signal sent by each transmitter and received by each receiver to be substantially the same in form. This matching of acoustic signals permits a method of clock offset determination which relies on the similarity of waveform to create an accurate time stamp of the arrivals of the reset and return acoustic signals. It is understood that the time stamp is equivalently termed the time of arrival or the arrival time. It is preferred to use compression waves when transmitting through the drill string. When it is desired to transmit an acoustic signal along a path through the drilling mud, acoustic apparatus 130 preferably includes at least one transducer 240 acoustically isolated from its housing and mounted such that its vibrational energy is transmitted to the mud. It is preferred to use compressional waves through mud as shear waves are not effectively transmitted through liquids.

Compressional and flexural waves can also be used to transmit a signal through the formation. When transmitting via this path, greater compensation may be desired for the increased attenuation, scattering, and spreading of the signal that occurs. If it is desired to use the formation path, transmitters and receivers isolated from the drill string, such as these described above with respect to the mud path, are used. This path has the advantage of traveling faster than the mud signal and therefore avoiding interference from the mud modes. It is to be understood that acoustic signal, acoustic wave, and electrical waveform can all equivalently be represented by the same functional dependence of intensity (amplitude) on time.

Signal Interpretation

Regardless of the acoustic path or paths selected for a given transmission, the signal received at the other end of the path will differ greatly from what was originally transmitted. First, the received signal will be delayed in real time by an amount equal to the path distance between the transducers divided by the velocity of sound along that path. Second, the phase and amplitude of the received signal will be altered, as portions of the signal travel along different paths and interfere with each other at the receiver. Third, the duration of any portion of the signal will be greater than the duration of that portion originally transmitted, as the variation in path lengths and path velocities will result in signals being received over a range of times. Lastly, reverberation of the tool itself can increase the duration of the received signal.

Figure 4A:
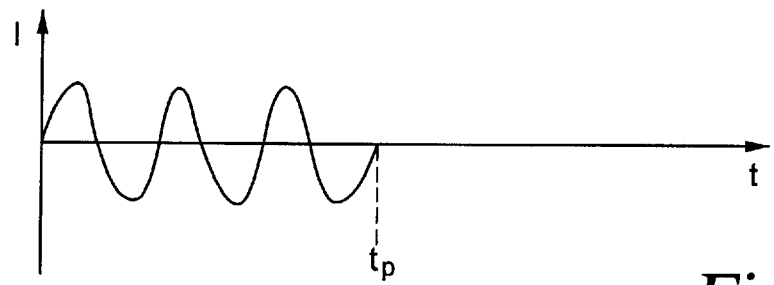
FIGS. 4A–4F show various transmitted, received, and processed signals.
Figure 4B:
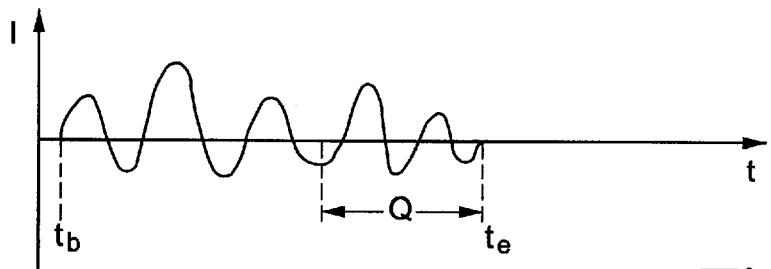

Referring now to FIGS. 4A and 4B, it can be seen that passage through the downhole environment affects both the amplitude and phase of a transmitted signal. Specifically, in FIG. 4A, a single signal pulse at frequency $f_1$ is transmitted for a time $t_p$, after which there is no transmitted signal. In FIG. 4B, receipt of the same signal pulse at a receiver some distance away begins at time $t_b$ and can be detected until some final time $t_e$. The initial transmission delay $t_b$ depends on path length. As shown in the figure, the duration of the received pulse, defined by the interval between $t_b$ and $t_e$, is greater than the initial duration of the pulse, $t_p$. In a downhole environment, at 8 kHz, the difference in length between the received pulse and the transmitted pulse can be as long as 36 ms (300 cycles). This interval is hereinafter referred to as the ring-down time, Q. During downhole calibration, Q can be determined on the basis of quantitative measurements for that well, or can be determined on the basis of previously gathered experimental data. Alternatively, the value of Q can be chosen to be safely outside the range of typical ring-down times, e.g. 1 second.

Figure 4C:
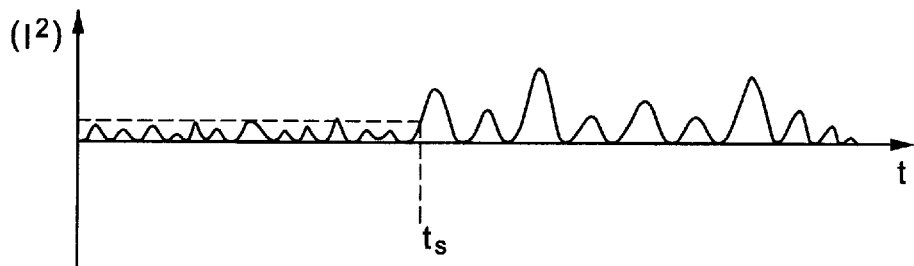

In order to determine the clock offset by the preferred method, an accurate time of arrival of the acoustic signal is desired. The time of arrival is determined from the acoustic signal which is a form of analog information, comprising a waveform with a continuous shape that reflects a variation in time. A method to determine the time of arrival is based on associating the event of arriving with a particular signal characteristic of a function of the waveform. Referring now to FIG. 4C, in one contemplated method of clock offset determination, one aspect of the signal characteristic comprises surpassing a preset intensity threshold for a preset duration of time. This may occur, for example, when a root mean square average of the acoustic signal exceeds a threshold. The average is computed over a suitable time window and compared to a suitable threshold. Both the time window and the threshold can be arbitrarily chosen by the system designer, but as a guideline, the time window may be a tenth to a quarter of the signal pulse length, and the threshold may be roughly two or three times the noise floor. The preset duration of time to surpass the threshold is imposed to eliminate false time of arrival data caused by noise.

Figure 4D:
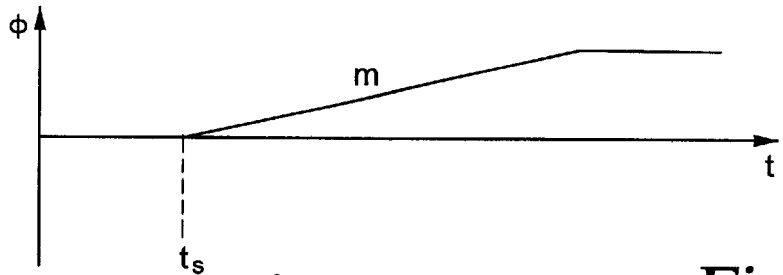

Referring now to FIG. 4D, in another contemplated method of clock offset determination, the Hilbert transform of the signal is taken. The Hilbert transform is used to convert the acoustic signal to a complex acoustic signal, with both a real and imaginary part. The complex acoustic signal can be written $A^* \exp(i\phi)$, where $\phi$ is the phase. The shape of the phase is followed as a function of time. When no signal is being received the phase varies randomly without significant progression in either direction. The slope of the variation of the phase with time is zero. When the reset acoustic signal arrives the slope undergoes a change. For a single frequency reset acoustic signal, the slope has a constant nonzero value until the reset acoustic signal ceases. The change to constant nonzero slope indicates the arrival of the reset acoustic signal. The change may be detected by imposing the criterion that the phase pass a preset threshold value. A change in phase that does not persist for at least a preset time interval is rejected as a criterion for determining the time of arrival. Contemplated variations in this procedure include the use of alternative phase change signatures. For example, the transmitted signal may include a reversal, in that the signal after a time point is the same as the signal before that time, except as if run backwards in time, producing a characteristic change in the slope of the variation of the phase with time.

Figure 4E:
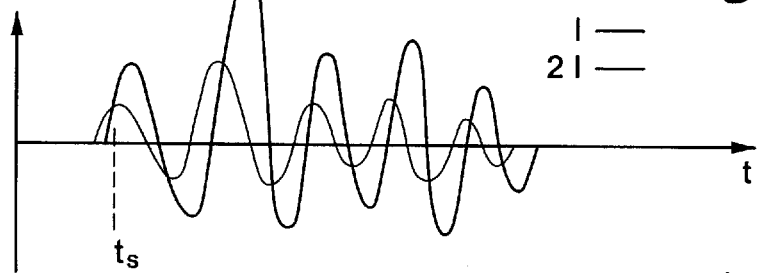

Referring now to FIG. 4E, in yet another contemplated method of clock offset determination, a constant timing fraction discriminator is used. A delayed version of the reset acoustic signal is multiplied by a coefficient and compared to the original reset acoustic signal. When the difference between the original signal and the delayed version is essentially zero, so the values of the delayed and original versions are essentially identical, the time of arrival of the reset acoustic signal is identified. To avoid false arrival time identification, an additional requirement may be made that the amplitude of the signal exceed a preset threshold. An apparatus for implementing this contemplated method is now described with reference to FIG. 5.

Figure 4F:
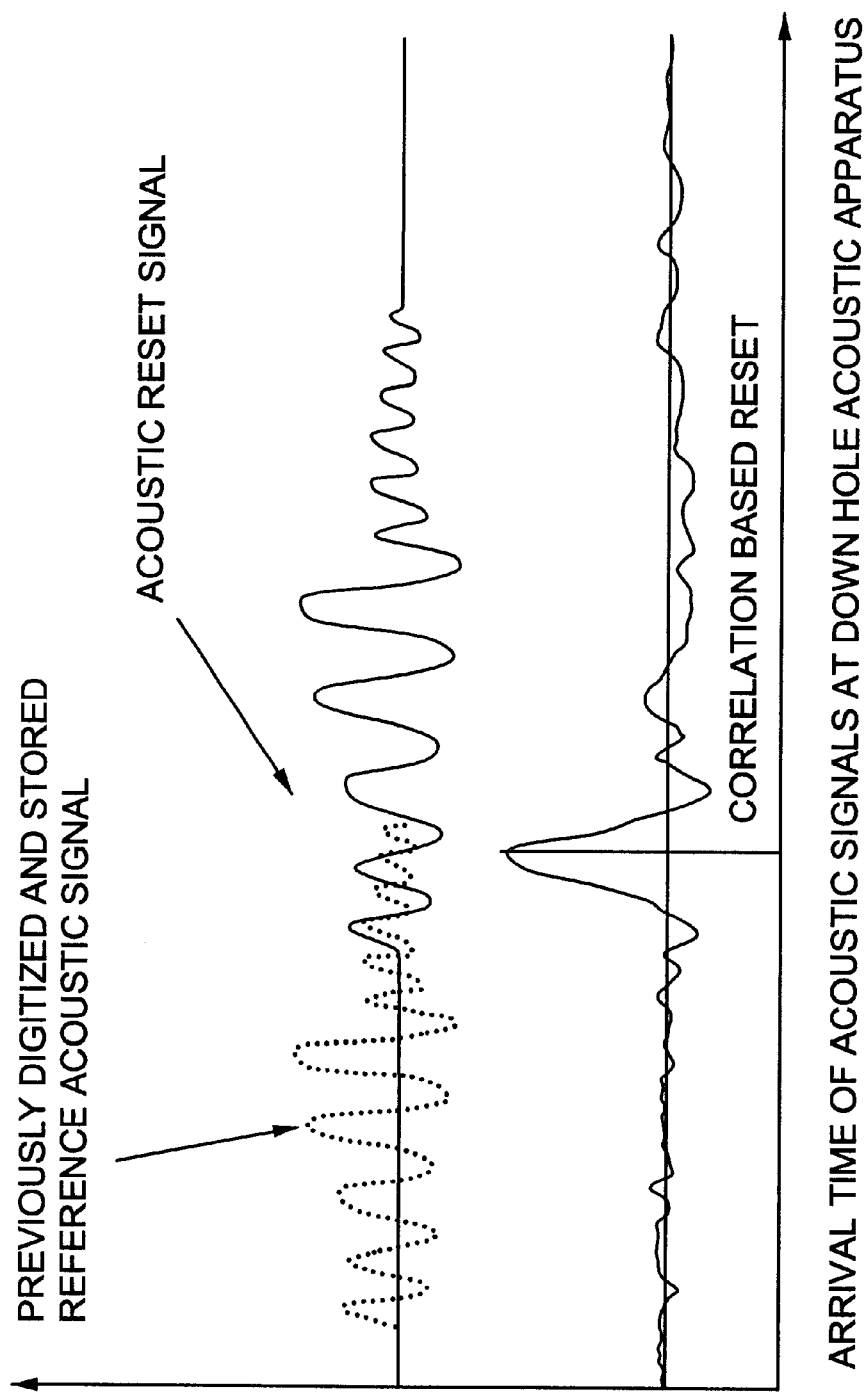

Referring now to FIG. 4F, in yet another contemplated method of clock offset determination, cross correlation between two received signals is used. At a prescribed time for the surface clock, an acoustic signal is sent to the downhole clock. This acoustic signal received by the downhole receiver before the reset signal is saved in a digital format in the downhole acoustic apparatus. The downhole acoustic apparatus waits for a predetermined time before sending a signal to the surface clock. After the surface apparatus receives this signal, it transmits the reset acoustic signal following a preset time delay. As the reset signal arrives at the receiver, the processor cross correlates the two signals and locates the inception of the signal from the maximum correlation value. When the difference between the original signal and the delayed version is essentially zero, so the values of the delayed and original versions are essentially identical, the time of arrival of the reset acoustic signal is identified. To avoid false arrival time identification, an additional requirement may be made that the amplitude of the signal exceeds a preset threshold. The apparatus uses the prescribed surface and downhole delays to calculate the travel time more accurately than the procedure which uses only one transmission from the surface and one from downhole.

Figure 5:
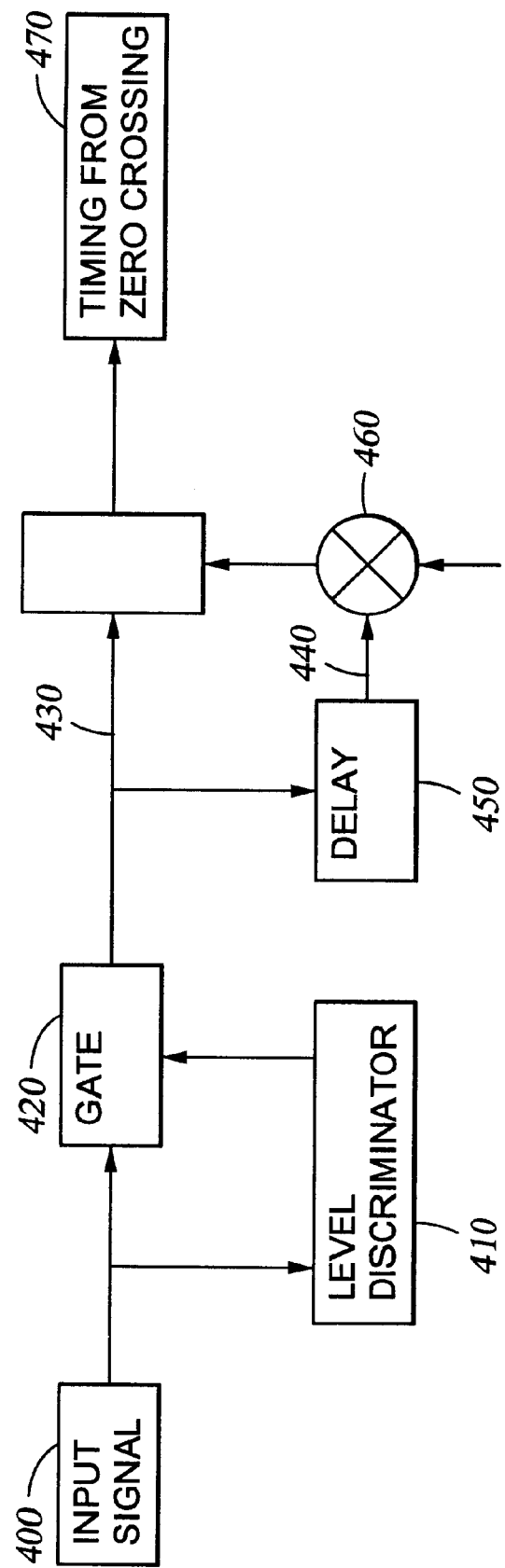
FIG. 5 is a functional block diagram of an embodiment of the constant fraction timing discriminator.

Referring now to FIG. 5, for an input signal which is either the reset acoustic signal or the return acoustic signal, the input signal 400 is passed through a level discriminator 410 and through a gate 420. Gate 420 disables the timing discriminator when the input signal is less than a preset threshold. The input signal is then split into an undelayed, original version 430 and a delayed version 440. Delay element 450 applies a constant time delay to the original version 430 to produce the delayed version 440. The delayed signal is passed through a signal multiplier, for example a times 2 multiplier 460. The product signal is then subtracted from the original signal to obtain a function of the waveform which, upon crossing the zero axis, indicates the time of arrival of the input signal. These zero-crossings occur when the delayed signal is a predetermined fraction of the undelayed signal. This advantageously makes the detected arrival time independent of attenuation. Time of arrival is computed as timing from zero crossing 470. Each of the contemplated methods is able to reliably provide arrival time detection with millisecond accuracy.

System Operation

Each apparatus preferably contains both transmitting and receiving circuitry, permitting two-way communication. In operation, the desired transducer is actuated to generate a modulated acoustic signal pulse, preferably in the frequency range of 200 Hz to 20 kHz and more preferably between 800 Hz and 2 kHz. One example of transducer which may be used is a piezoelectric stack, as evidenced by U.S. Pat. Nos. 2,810,546, 3,588,804, 3,790,930, 3,813,656, 4,282,588, 4,283,779, 4,302,826, and 4,314,365. In this example, the signal is created by applying tone-burst pulses of an appropriate voltage across one or more piezoelectric crystals, causing them to vibrate at a rate corresponding to the frequency of the desired acoustic signal. The balance of the following discussion will address techniques for optimizing successful transmission of a desired signal between a single transmitter/receiver pair located in the drill string. It will be understood that many of the same principles apply and could be used simultaneously or separately to transmit signals between other transmitter/receiver pairs in the same hole. The acoustic wave excited by the transducer propagates through the drill string and surrounding earth. As the acoustic wave propagates, it is modified. In particular the acoustic wave is attenuated by spreading, frictional losses, and dissipation according to generally understood principles. Because dissipation increases as frequency increases, the desired transmission distance will effectively set a maximum operable frequency. An acoustic wave comprising components oscillating at different frequencies also suffers dispersion by frequency dependent interaction with, scattering by, transmission through, and reflection from the transmission medium according to generally understood principles.

Since the present system is intended to operate with acoustic properties ranging over several orders of magnitude, which could occur in a single well, it is clearly advantageous to provide for operation over a wide range of frequencies. Accordingly, the system is preferably self-adaptive in selecting the proper operating frequency from time to time as the operating environment changes. The system is also intended to be able to generate a modulated signal comprising two or more components at different frequencies, which signal may be represented mathematically as a function of those frequencies by usual series expansion techniques.

The downhole acoustic apparatus can be designed to minimize the current drain on the downhole battery pack. While the tool is being run to bottom, the downhole acoustic apparatus is in a low power "sleep" mode. Every few minutes, a downhole clock coupled to the downhole acoustic apparatus, turns on the signal processor and its associated circuitry for a few seconds, long enough to detect a predetermined sounding signal from the surface acoustic apparatus. If no such signal is detected by the downhole acoustic apparatus, the microprocessor and associated circuitry go back into the "sleep" mode until the next power-up period.

Once the sounding signal initiates the power up of the downhole apparatus, it is desired to synchronize the downhole clock. A reset signal is sent from the surface acoustic apparatus to the downhole acoustic apparatus. The downhole acoustic apparatus receives the reset signal, causes the downhole clock to reset and transmits a return acoustic signal to the surface after waiting a ring-down time. The surface acoustic apparatus receives the return acoustic signal and computes the time elapsed between transmitting the reset signal and receiving the return acoustic signal. From this elapsed time a clock offset is obtained.

Figure 6A:
FIGS. 6A–6D depict the operation of various clocks, and a method for determining a clock offset.
Figure 6B:
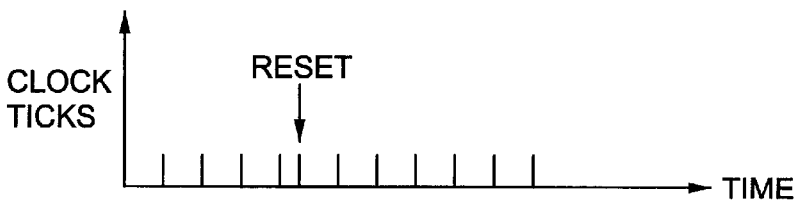
Figure 6C:
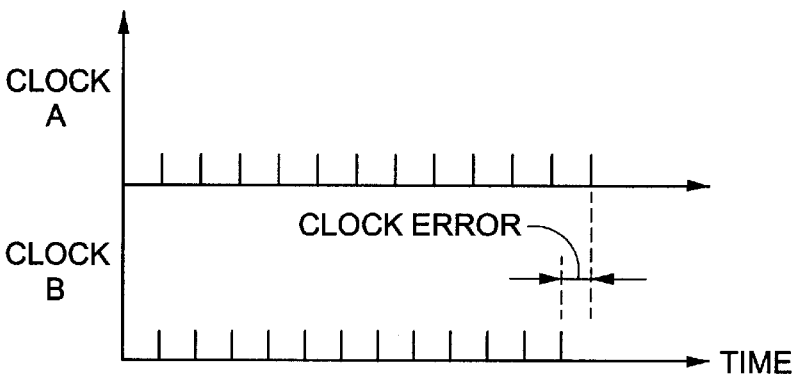
Figure 6D:
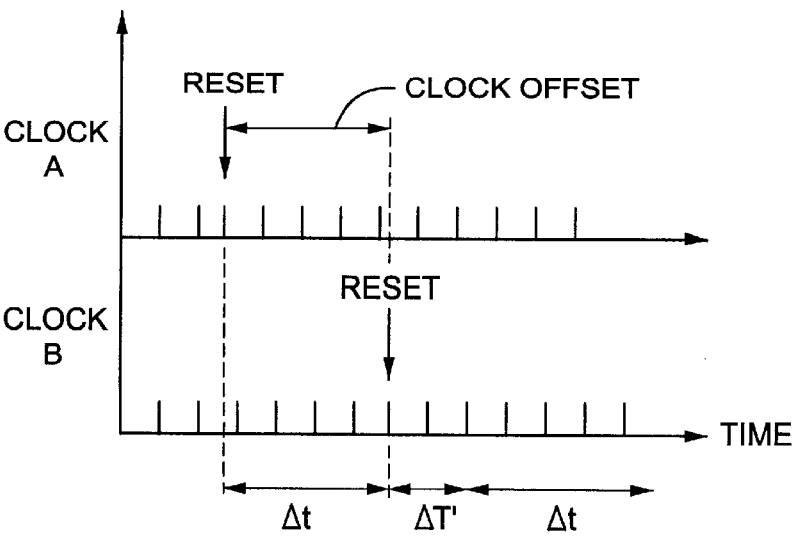

The clocks are stable for closely timed measurements, such as those on the same day. A suitable clock is a crystal clock. Referring to FIG. 6A, a clock produces regular ticks of time at equally spaced increments. The clock may contain an oscillator, which beats at the frequency corresponding to the time increment between ticks. Referring to FIG. 6B, the clock may be reset so that the ticks start from a new time zero. The downhole clock may be synchronized on the surface with the surface clock before being lowered into the wellbore. However, the downhole environment, in particular the altered temperature with respect to the surface, causes drift over the course of several days. Typically, the drill bit remains in operation for days at a time. Referring to FIG. 6C, the downhole clock may be clock A, decreased in frequency at higher temperature, so that the time increment between ticks is larger. This produces a clock error, leading to erroneous records of time in measurements utilizing the downhole clock. Referring now to FIG. 6D, letting the downhole clock be clock A, the clock offset determination procedure is illustrated. Clock B, the surface clock, is reset, as a reset signal is sent from the surface acoustic apparatus to the downhole acoustic apparatus. This signal arrives at time ΔΔt, measured with respect to the surface clock. The downhole signal processor resets the downhole clock when the reset acoustic signal is received and waits a preset delay ΔT' before instructing the transmitter to transmit a return acoustic signal. This delay is set at ΔT at the surface, but due to clock drift it is implemented as ΔT' downhole. However, on time scale that determination of the clock offset occurs the difference between at ΔT and ΔT' is essentially negligible. The return acoustic signal is received at the surface after a time Δt, resulting in a net delay between transmission of the reset acoustic signal and receipt of the return acoustic signal at the surface of 2Δt+ΔT'. Since ΔT'=ΔT for the purposes of determining the clock offset and ΔT is known, the difference Δt is obtained.

The clock offset may be expressed in terms of the measured signal travel times in a number of ways. Referring to FIG. 6D, in a preferred embodiment the clock offset is the time Δt between surface transmittal and downhole receipt of the reset acoustic signal, or, essentially the same time Δt between downhole transmittal and surface receipt of the return acoustic signal. It is to be understood that variations in the expression of the clock offset are within the scope of the preferred embodiment.

Further the surface processor calculates the time in the surface clock when the downhole clock was reset to 0. Referring to FIG. 7, the time calculated by the surface processor, when the downhole clock was reset can be coded using a series of acoustic signals as follows. The surface acoustic apparatus first transmits a time indicator acoustic signal to the downhole acoustic apparatus, to indicate the onset of signals carrying time stamp information as well as to start the timing counter. The surface apparatus transmits the next acoustic signal after a delay of (0.1*x) seconds where x−1 is the number of full hours in the time stamp, ranging from 0 to 23. The next acoustic signal is transmitted after a delay of (0.1*y) seconds, where y−1 represents the full minutes in the time stamp, ranging from 0 to 59. Similarly, the following acoustic signal is transmitted after a delay of (0.1*z) seconds, where z−1 represents the full seconds in the time stamp, ranging from 0 to 59. The last acoustic signal is transmitted after a delay of (0.1*m) seconds, where m−1 represents full milliseconds in the time stamp, ranging from 0 to 999. In an alternative method, the date on the surface clock may be communicated to the downhole acoustic apparatus by an additional set of acoustic pulses, with time delays representing the date.

EXAMPLE

Figure 8:
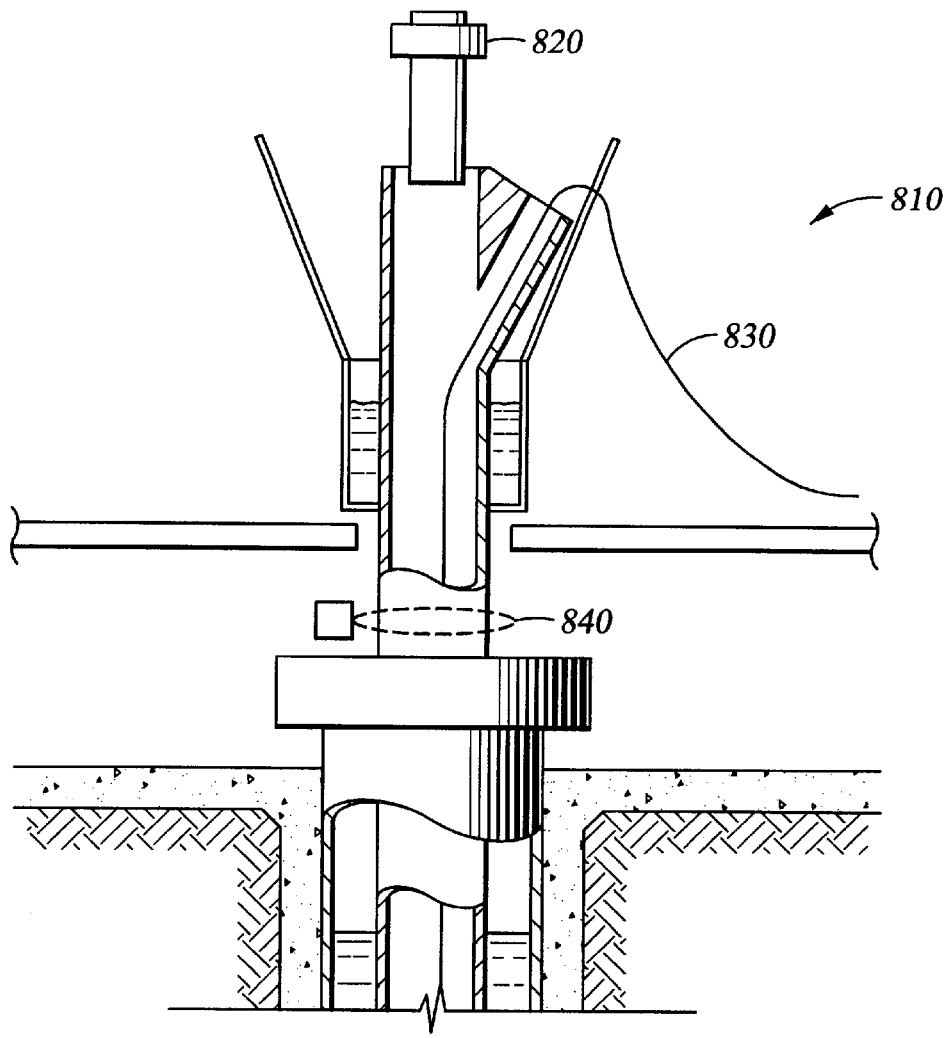
FIG. 8 shows exemplary test setup and apparatus.
Figure 9A:
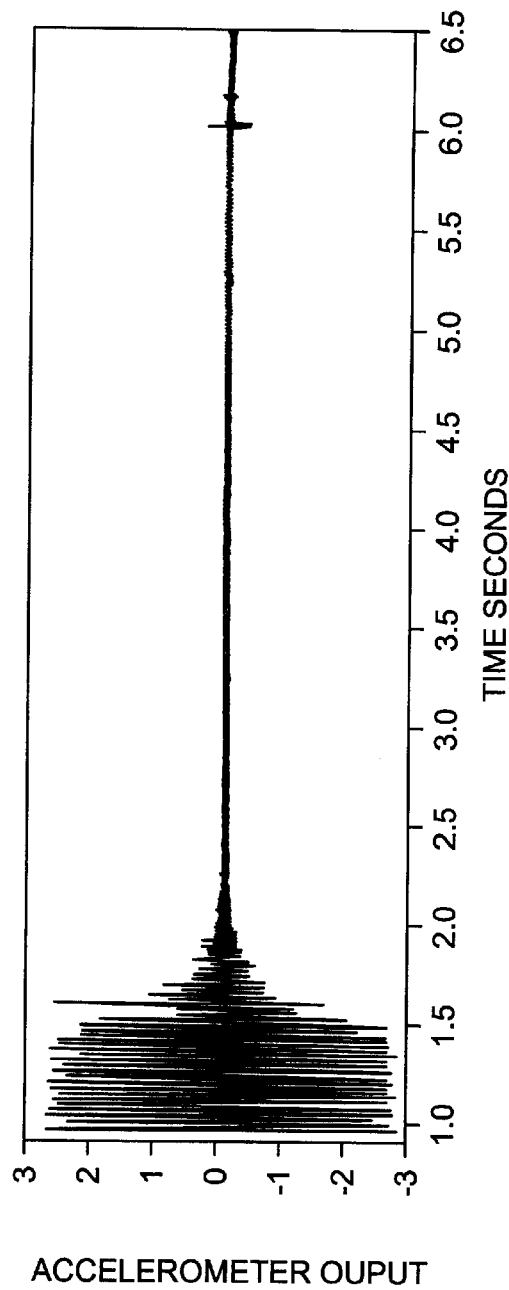
FIG. 9 shows exemplary acoustic signals recorded at the surface and at 886 m below the surface.
Figure 9B:
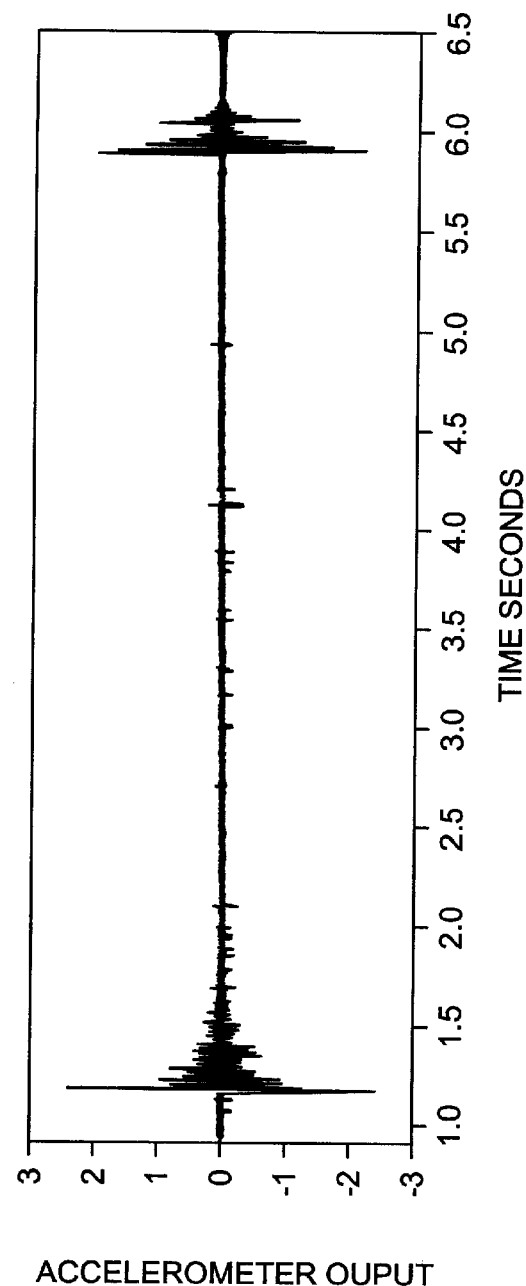

Prototype experiments were conducted at the Halliburton Technology Center, at Carrollton. These experiments were carried out prove the feasibility of downhole clock synchronization. Additionally, these were conducted to study the effect of different depths of the downhole acoustic apparatus on the synchronization accuracy as well as, find the relative compensation accuracy of the two different types of transmitters. Referring now to FIG. 8, a schematic of the experimental set-up is shown. Apparatus 810 includes drop hammer 820. The drop hammer was devised by imparting velocity to a mass of steel using a pneumatic source and acts as the surface transmitter. The mass was allowed to impact on the cross-section of the pipe and thus impart an acoustic impulse in the tubing. Apparatus 810 further includes wireline 830, surface accelerometer 840, acting as the surface sensor, downhole SPCA transmitter 850, and downhole accelerometer 860, acting as the downhole sensor. Referring to FIG. 9, the signal produced by the drop hammer is shown in the upper curve. A single point contact acoustic transmitter (SPCAT) is capable of generating a well-defined toneburst of a specified frequency. This transmitter was used as a downhole device. Referring to FIG. 9, the signal produced by the SPCAT is shown in the lower curve. The intensity peak at later time in the upper curve shows the arrival of the SPCAT signal at the surface site. The intensity peak at later time in the lower curve shows the arrival of the drop hammer signal at the downhole site. These experiments demonstrate viability of signal propagation over a length of about 900 meters.

Figure 10:
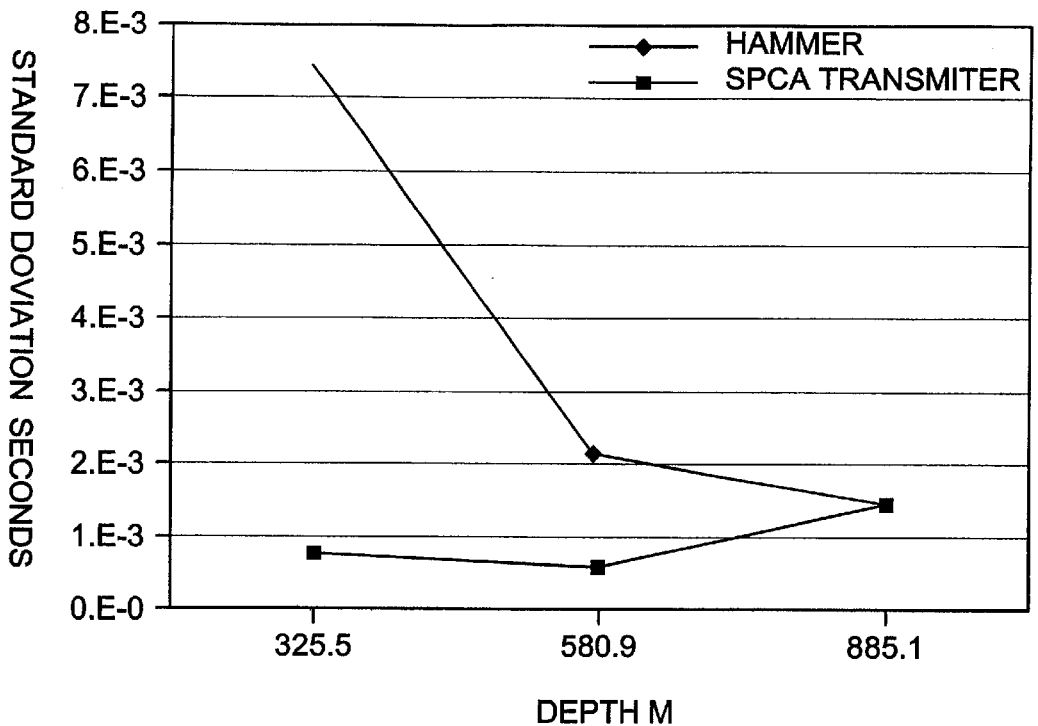
FIG. 10 shows illustrative measurement deviation for different sources.
Figure 11:
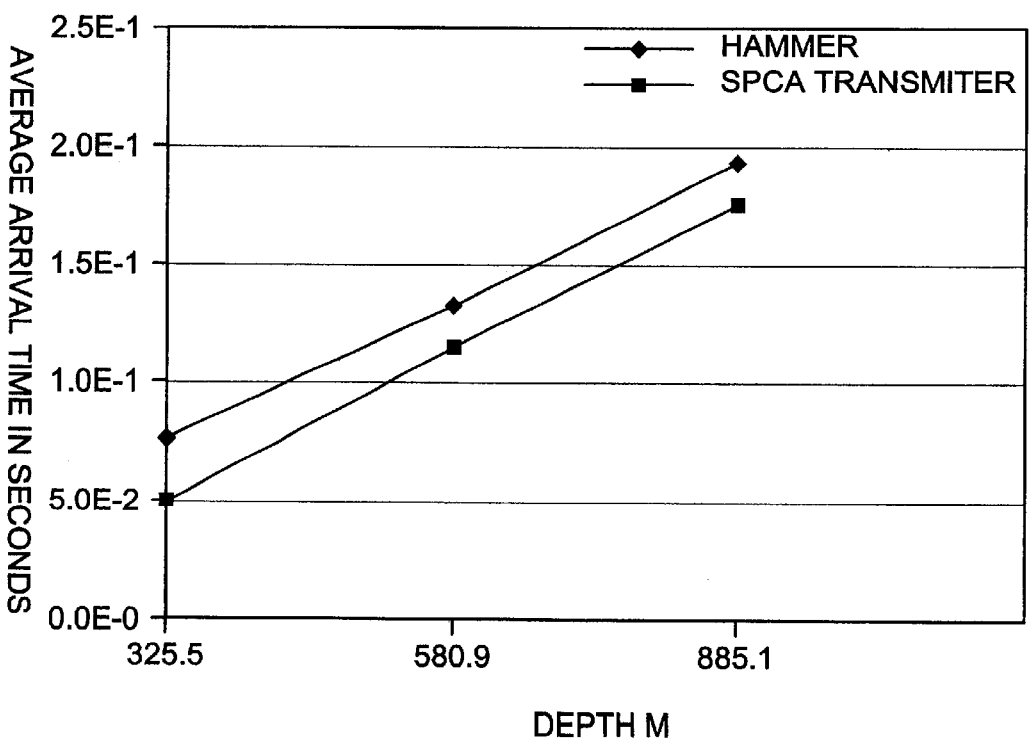
FIG. 11 shows computed arrival times at different depths.

Referring to FIG. 10, unfiltered RMS threshold timing measurements yielded a consistency of within 1–3 milliseconds in the SPCAT source and 1–4 milliseconds for the drop hammer. The drop hammer yielded larger variations at smaller depths. Using the methods to determine time of arrival described above, arrival times were computed for the experimental signals shown in FIG. 8. Referring to FIG. 11, arrival times were determined for different depths of the downhole clock. These data demonstrate the viability of the method of clock offset determination disclosed herein.

APPLICATIONS

The advantages provided by the present invention include the ability to correct for desynchronization of clocks used in logging while drilling (LWD) applications utilizing acoustic telemetry. Logging while drilling applications include seismic profiling, including vertical seismic profiling, reverse seismic profiling, look ahead seismic profiling and variations and combinations thereof. Accurate clock offset determination is central to accurate seismic profiling measurements, as these measurements depend on recording the arrival time of seismic waves at locations both downhole and on the surface. A seismic profiling system may include measurement and clock offset determination apparatuses located in a plurality of wellbores, for example in a first wellbore and a second wellbore located at some distance from the first wellbore. Alternatively, a seismic profiling system may comprise measurement and clock offset determination apparatuses located in a single wellbore.

It will be readily apparent to one of ordinary skill in the art that the clock offset determination system disclosed herein can be readily adapted for use also as a measurement system, for example for recording time of arrival of acoustic signals used in acoustic telemetry systems. Thus, in an acoustic telemetry system the measurement apparatuses may share components with the clock offset determination system disclosed herein. For example, the signal processor may also receive signals input from data sensors adapted to obtain specific measurements, such as temperature sensors, environmental acceleration sensors, inclinometers, and the like. The transmitter, receiver, transducer, sensor, or signal processor may each be shared with a measurement system. For the application using the downhole clock, said clock is shared with the measurement system of that application.

While a preferred embodiment of the invention has been disclosed, various modifications can be made to the preferred embodiment without departing from the principles of the present invention.

Contemplated variations for the acoustic clock offset determination system include different selections of apparatus for transmitting and receiving acoustic signals. For example, the transmitter and receiver may be both implemented by a single transceiver. Further, the transducer and sensor may both be implemented by a single transducer/sensor. Examples of suitable transducers include single point contact acoustic transmitters, as evidenced by U.S. patent application Ser. No. 09/087,220, which is hereby incorporated herein by reference. Drop hammers are also known. Examples of suitable acoustic sensors include piezoelectric crystals and accelerometers, strain gauges, fiber optic accelerometers, etc as is known in the art.

What is claimed is:

1. A system for determining a clock offset between a second clock on a drill string and a first clock on the drill string, said system comprising:
    a first acoustic apparatus associated with said first clock, said apparatus comprising:
        a first transmitter configured to transmit a reset acoustic signal;
        a first signal processor configured to reset the first clock as the reset acoustic signal is transmitted; and
    a second acoustic apparatus associated with said second clock, said apparatus comprising:
        a second receiver configured to receive the reset acoustic signal;
        a second signal processor configured to reset the second clock as the reset signal is received;
        a second transmitter configured to transmit a return acoustic signal at a predetermined time after the second clock is reset;
    wherein the first acoustic apparatus further comprises a receiver configured to receive the return acoustic signal;
    wherein the first signal processor is further configured to determine the clock offset from a measured time interval between transmitting the reset acoustic signal and receiving the return acoustic signal.

2. The system of claim 1, wherein each transmitter further comprises a transducer that is one of a set that consists of a drop hammer, a piezoelectric stack, and a single point acoustic transmitter.

3. The system according to claim 1, wherein said receiver further comprises an accelerometer.

4. The system according to claim 1, wherein said transmitter generates an acoustic signal pulse of a preset duration.

5. The system of claim 1, wherein each of said signal processors is configured to reset the associated clock once the received signal exceeds a preset threshold and the reset signal achieves a value that is a predetermined multiple of a delayed version of the received signal.

6. The system of claim 5, whereby the signal processor achieves an accuracy of less than one millisecond in determining the clock offset.

7. The system of claim 1, wherein said each of said signal processors is configured to reset the associated clock a when a change of slope is observed in a Hilbert transform of the reset signal.

8. The system of claim 7, whereby the signal processor achieves an accuracy of less than one millisecond in determining the clock offset.

9. The system of claim 1, wherein each of said signal processors is configured to reset the associated clock once a root mean square average of the reset signal exceeds a preset threshold.

10. The system of claim 9, wherein the average is taken over a preset time interval.

11. The system of claim 10, whereby the signal processor achieves an accuracy of less than one millisecond in determining the clock offset.

12. A method of determining a clock offset between a second clock at a second point on a drill string and a first clock at a first point on a drill string, wherein the method comprises:
    (a) transmitting a first acoustic signal from a first point;
    (b) resetting the first clock;
    (c) receiving the first acoustic signal at the second point;
    (d) processing the first acoustic signal;
    (e) resetting the second clock;
    (f) transmitting second acoustic signal from the second point;
    (g) receiving the second acoustic signal at the first point;
    (i) processing the second acoustic signal, wherein said processing each of said first and second acoustic signals further comprises, determining a time arrival using a constant fraction timing discriminator.

13. The method of claim 12, whereby the clock offset is determined with at least millisecond accuracy.

14. A method for determining a clock offset between a second clock at second point on a drill string and a first clock at a first point on a drill string, wherein the method comprises:
    (a) resetting the first clock at a first reset time;
    (b) transmitting a first acoustic signal from the first point;
    (c) receiving the first acoustic signal at the second point;
    (d) determining a first time arrival of the first acoustic signal;
    (e) resetting the second clock after a preset ring-down delay after said first time of arrival of said first acoustic signal;
    (f) transmitting a second acoustic signal from the second point;
    (g) receiving the second acoustic signal at the first point; and
    (h) determining a second time of arrival of said second acoustic signal after said first reset time of the second acoustic signal.

15. The method of claim 14, wherein each of said determining a first time of arrival and determining a second time of arrival comprises using a method chosen from a group which consists of root mean square threshold determination, change of phase of Hilbert transform determination, and constant fraction time discrimination determination.

16. The method of claim 15, whereby the clock offset is determined with at least millisecond accuracy.

17. A method for determining a clock offset between a second clock coupled to a second acoustic apparatus in a drill string and a first clock coupled to a first acoustic apparatus in a drill string, wherein the method comprises:
    (a) transmitting a first acoustic signal from the first acoustic apparatus;
    (b) determining a first reset time;
    (c) resetting the first clock at the first reset time;
    (d) receiving the first acoustic signal at the second acoustic apparatus;
    (e) transmitting a second acoustic signal from the second acoustic apparatus after a preset delay after receiving the first acoustic signal;
    (f) determining a second reset time;
    (g) resetting the second clock at the second reset time;

(h) receiving the second acoustic signal at the first acoustic apparatus.

18. The method of claim 17, wherein determining a first reset time further comprises:
   (1) determining a first transmission time of the first acoustic signal;
   (2) identifying the first reset time with the first transmission time.

19. The method of claim 17, wherein determining a first reset time further comprises:
   (1) receiving the first acoustic signal at the first acoustic apparatus;
   (2) determining a first time of arrival of the first acoustic signal;
   (3) identifying the first reset time with the first time of arrival.

20. The method of claim 17, wherein determining a second reset time further comprises:
   (1) determining a second transmission time of the second acoustic signal;
   (2) identifying the second reset time with the second transmission time.

21. The method of claim 17, wherein determining a second reset time further comprises:
   (1) determining a second time of arrival of the first acoustic signal;
   (2) identifying the second reset time with the second time of arrival.

22. A method for determining a clock offset between a second clock at a second point on a drill string and a first clock at a first point on a drill string, wherein the method comprises:
   (a) transmitting a first acoustic signal from the first point;
   (b) receiving the first acoustic signal at the second point;
   (c) transmitting a second acoustic signal from the second point;
   (d) receiving the second acoustic signal at the first point;
   (e) determining a reset time of the second clock;
   (f) resetting the second clock;
   (g) after said resetting the second clock, waiting a preset delay, before said transmitting said second signal.

23. The method of claim 22, further comprising:
   (h) conveying reference date and time data from the first point to the second point.

24. The method of claim 22, further comprising:
   (h) before said transmitting the first acoustic signal, receiving an externally generated acoustic signal at the first point.

25. The method of claim 22, wherein said determining a reset time of the second clock comprises:
   (i) after said receiving the second acoustic signal, waiting a second preset delay;
   (ii) transmitting a third acoustic signal from the first point;
   (iii) receiving the third acoustic signal at the second point;
   (iv) determining a cross-correlation between the first acoustic signal and the third acoustic signal.

26. The method of claim 25, wherein said determining a reset time of the second clock further comprises:
   (vi) after said determining a cross-correlation, waiting a third preset delay;
   (vii) transmitting a fourth acoustic signal from the second point;
   (viii) transmitting a fifth acoustic signal from the first point;
   (ix) determining a cross-correlation among the first acoustic signal, the third acoustic signal, and the fifth signal.

* * * * *